United States Patent [19]

Cubero-Castan et al.

[11] Patent Number: 5,239,653

[45] Date of Patent: Aug. 24, 1993

[54] SWITCHING DEVICE FOR BALANCING LOAD IN COMMUNICATION NETWORK BASED ON SOURCE AND DESTINATION LOAD INFORMATION AND INTERNAL LOAD INFORMATION

[75] Inventors: Michel Cubero-Castan, Toulouse; Guy Durrieu, Saint Orens; Bernard Lecussan, Balma; Michel Lemaitre, Toulouse, all of France

[73] Assignee: Office National d'Etudes et de Recherches Aerospatiales, Chatillon, France

[21] Appl. No.: 426,262

[22] Filed: Oct. 25, 1989

[30] Foreign Application Priority Data

Oct. 26, 1988 [FR] France ............................. 88-13969

[51] Int. Cl.$^5$ .......................................... G06F 13/00
[52] U.S. Cl. ..................................... 395/800; 395/325; 370/60; 370/84; 340/825.03; 364/942.07; 364/939.4; 364/DIG. 2
[58] Field of Search ............... 395/800, 325, 250, 200; 370/94.1, 53, 60, 84; 340/825.03; 379/335; 364/140, 166

[56] References Cited

U.S. PATENT DOCUMENTS

| | | | |
|---|---|---|---|
| 4,032,899 | 6/1977 | Jenny et al. | 364/200 |
| 4,363,094 | 12/1982 | Kaul et al. | 364/200 |
| 4,491,916 | 1/1985 | Vallhonrat | 364/200 |
| 4,543,627 | 9/1985 | Schwab | 364/200 |
| 4,543,628 | 9/1985 | Pomfret | 364/200 |
| 4,577,272 | 3/1986 | Ballew et al. | 364/200 |
| 4,658,098 | 4/1987 | Wegmann | 379/113 |
| 4,777,595 | 10/1988 | Strecker et al. | 364/200 |
| 4,928,234 | 5/1990 | Kitamura et al. | 364/200 |
| 4,999,771 | 3/1991 | Ralph et al. | 364/200 |

OTHER PUBLICATIONS

Hwang and Briggs, *Computer Architecture and Parallel Processing*, 1984, pp. 350-354 and 481-502 (McGraw-Hill).

Primary Examiner—Thomas C. Lee
Assistant Examiner—Alpesh M. Shah
Attorney, Agent, or Firm—Lowe, Price, LeBlanc & Becker

[57] ABSTRACT

A data switching device embodying the invention mainly includes two input circuits, two output circuits, and a load regulating circuit. The two input circuits are respectively connected to two source devices transmitting data messages. The two output circuits are respectively connected to two destination devices toward which the messages are switched. The load regulating circuit derives switching instructions as a function of external load information supplied by the destination means and provides other load information intended for the source devices. Switching control means based on a priority management are divided out over the input and output circuits. The switching device is usable to set up divided load-regulated and controlled switching networks intended notably for symbol processing multiprocessor systems.

7 Claims, 8 Drawing Sheets

| Bmt for n | Bse | $S_0$ | $S_1$ | $FM_0$ | $FM_1$ | DE | SE | Bmt for n+1 | Bse |
|---|---|---|---|---|---|---|---|---|---|
| 0 | 0 | 0 | 0 | X | X | 0 | 0 | 0 | 0 |
| 0 | 0 | 0 | 1 | X | 0 | 1 | 1 | 1 | 1 |
| 0 | 0 | 0 | 1 | X | 1 | 1 | 1 | 0 | 1 |
| 0 | 0 | 1 | 0 | 0 | X | 1 | 0 | 1 | 0 |
| 0 | 0 | 1 | 0 | 1 | X | 1 | 0 | 0 | 0 |
| 0 | 0 | 1 | 1 | X | 0 | 1 | 1 | 1 | 1 |
| 0 | 0 | 1 | 1 | X | 1 | 1 | 1 | 0 | 1 |
| 0 | 1 | 0 | 0 | X | X | 0 | 0 | 0 | 1 |
| 0 | 1 | 0 | 1 | X | 0 | 1 | 1 | 1 | 1 |
| 0 | 1 | 0 | 1 | X | 1 | 1 | 1 | 0 | 1 |
| 0 | 1 | 1 | 0 | 0 | X | 1 | 0 | 1 | 0 |
| 0 | 1 | 1 | 0 | 1 | X | 1 | 0 | 0 | 0 |
| 0 | 1 | 1 | 1 | 0 | X | 1 | 0 | 1 | 0 |
| 0 | 1 | 1 | 1 | 1 | X | 1 | 0 | 0 | 0 |
| 1 | 0 | 0 | 0 | X | X | 0 | 0 | 1 | 0 |
| 1 | 0 | 0 | 1 | X | X | 0 | 0 | 1 | 0 |
| 1 | 0 | 1 | 0 | 0 | X | 1 | 0 | 1 | 0 |
| 1 | 0 | 1 | 0 | 1 | X | 1 | 0 | 0 | 0 |
| 1 | 0 | 1 | 1 | 0 | X | 1 | 0 | 1 | 0 |
| 1 | 0 | 1 | 1 | 1 | X | 1 | 0 | 0 | 0 |
| 1 | 1 | 0 | 0 | X | X | 0 | 1 | 1 | 1 |
| 1 | 1 | 0 | 1 | X | 0 | 1 | 1 | 1 | 1 |
| 1 | 1 | 0 | 1 | X | 1 | 1 | 1 | 0 | 1 |
| 1 | 1 | 1 | 0 | X | X | 0 | 1 | 1 | 1 |
| 1 | 1 | 1 | 1 | X | 0 | 1 | 1 | 1 | 1 |
| 1 | 1 | 1 | 1 | X | 1 | 1 | 1 | 0 | 1 |

SWITCHING DEVICE FOR BALANCING LOAD IN COMMUNICATION NETWORK BASED ON SOURCE AND DESTINATION LOAD INFORMATION AND INTERNAL LOAD INFORMATION

BACKGROUND OF THE INVENTION

1. Field of the Invention

This invention relates in general to communication networks for the simultaneous transmission of data messages between a plurality of source devices and a plurality of destination devices. More particularly, it relates to a communication network using a switching device specialized in the transfer of data messages. The switching device is called a communication processor, and is intended for use in multiprocessor data processing systems, e.g. for parallel processing of information.

2. Description of the Prior Art

In multiprocessor parallel information processing systems, the processors, which carry out programs or processes at their own speed ad in a partially asynchronous manner from one to the next, ned to communicate intermittently with one anther and/or with a set of memories. The transfer of data messages between the processors and memories in question should be carried out in optimal speed conditions, avoiding access conflicts at communication means level. To increase their power, these systems are expected to be able to carry out an ever-increasing number of processes in parallel. Under these conditions, it is necessary to efficiently solve:

the problems relating to the communication of data messages, and the problem of the division of work between the different processors and memories of the multiprocessor system.

A well known means of interconnecting several processors consists in connecting them all to one communication bus and in using a control unit to manage the data message exchanges between processors in a centralized and hierarchical fashion. The major drawback of this communication means by a single bus is to be only able to make, at a given moment, one communication form one processor the next. The single bus is penalizing all the more that the number of processors to be interconnected is high. Moreover, this drawback is only partially remedied by multiplying the number of communication buses.

To obviate these drawbacks, it was suggested that the data messages be exchanged through communication networks. Different architectures for these networks and particularly an "Omega" architecture presenting certain advantages are described by HWANG and BRIGGS in their publication entitled "Computer Architecture and Parallel Processing", McGRAW HILL edition, 1984, p. 350 to 354 and 481 to 502.

A communication network of the co-called "Omega" type disclosed by HWANG and BRIGGS enables a considerable improvement to be obtained in the speed of data transfers between processors. However, such a network still requires the use of a centralized control unit, entrusted with determining of the routing paths and solving the access conflicts on side of the switching devices. The need of this centralized control unit restricts the size of the network due to programming difficulty which is all the greater that the network is of large size. Furthermore, the work divide problem in this network is dealt with separately from the routing by another control unit which also has a programming difficulty increasing with the size of the network.

OBJECTS OF THE INVENTION

The main object of this invention is to remedy the preceding disadvantages.

Another object of this invention is to provide a switching device for communication networks that is designed to route the messages so as to ensure optimum and automatic regulation of the work loads between the different processors and to solve the access conflicts in a totally decentralized manner.

SUMMARY OF THE INVENTION

Accordingly, a data message switching device embodying the invention comprises first and second input means respectively connected to first and second source devices to receive and process messages transmitted by the source devices, first and second output means respectively connected to first and second message destination means for receiving messages switched by the first and second input means, thereby transmitting the switched messages to the first and second destination means, load regulating means connected to the input means, the source means and the destination means for deriving switching instructions and internal load informations, the switching instructions being intended for the first and second input means and being deriving as a function of first and second external load informations respectively transmitted by the first and second destination mans and as a function of internal load informations which are produced in the first and second input means as a function of message switchings carried out in the input means, the load regulating means further deriving other first and second load informations which are respectively intended for the first and second source means and which are calculated in terms of the first and second external load informations and the internal load informations, and control means divided out over the first and second input and output means, for controlling the message switchings as a function of routing information included in the messages, the switching instructions derived by the load regulating means, and priority instructions respectively assigned to the first and second source means, and the control means in the input means producing the internal load informations.

According to a feature of the invention, each of the first and second input means comprises a buffer queue for temporarily stocking the messages transmitted by the source means, means for word by word controlling the message writing and reading in the buffer queue, means for selecting one of the first and second output means toward which a message read in the buffer queue is to be switched, the output means being selected by decoding the routing information included in the message and as a function of the switching instructions derived by the load regulating means, means for producing the internal load information as a function of the routing information included in the read message, and means for controlling a reading of the message in the buffer queue, a transferring of the read message and the internal load informations respectively to the selected output means and the load regulating means, the controlling mean also checking operations of the selecting means and producing means.

According to another feature of the invention, each of the first and second output means comprises means for selecting one of the input first and second means as a function of predetermined priority instructions assigned to the source means and to the input means when the two input means simultaneously request a message transmission authorization to the output means, means for informing the selected input means that the output means authorizes the message transmission, and means having first and second input respectively connected to the first and second input means and an output connected to the destination means corresponding to the output means for switching over the message whose transmission is authorized, form the selected input means to the destination means.

According to yet another feature of the invention, the load regulating means comprises means for memorizing different load count differential corresponding to different types of loads, each of the differentials having a value representative of the deference between a number of corresponding first load information and a number of corresponding second load informations, and first and second load information being transmitted by the first and second destination means, means for incrementing and decrementing the load count differentials as a function of the first and second load informations transmitted by the destination means and the internal load information produced by the input means, means for determining the switching instructions to be supplied to the input means, and means for deriving the first and second load information as a function of values and variations of the load count differentials, thereby transmitting the first and second load informations to the source means.

The invention also provides for a data message communication network particularly for multiprocessor systems, comprising a plurality of switching devices embodying the invention. The switching devices are interconnected to form a predetermined network architecture. Each of the switching devices comprises initiating means for programming itself as a function of its location in the network, by means of information supplied by the multiprocessor system respectively when the system is started up and when subsequent initiating operations are carried out thereby changing logically the architecture of the network.

The invention is applicable e.g. to the production of parallel data processing machines for symbolic processing, these machines using formal data processing languages, such as LISP language, which are particularly well suited to the solving of the complex problems existing in the field of artificial intelligence. The invention is also usable in conventional data processing systems. Moreover, a switching network embodying the invention can be produced in modular form in VLSI technology.

BRIEF DESCRIPTION OF THE DRAWING

Further features and advantages of the invention will be apparent from the following particular description of several preferred embodiments of this invention as illustrated in the corresponding accompanying drawings in which.

DESCRIPTION OF THE PREFERRED EMBODIMENTS

Figure 1:
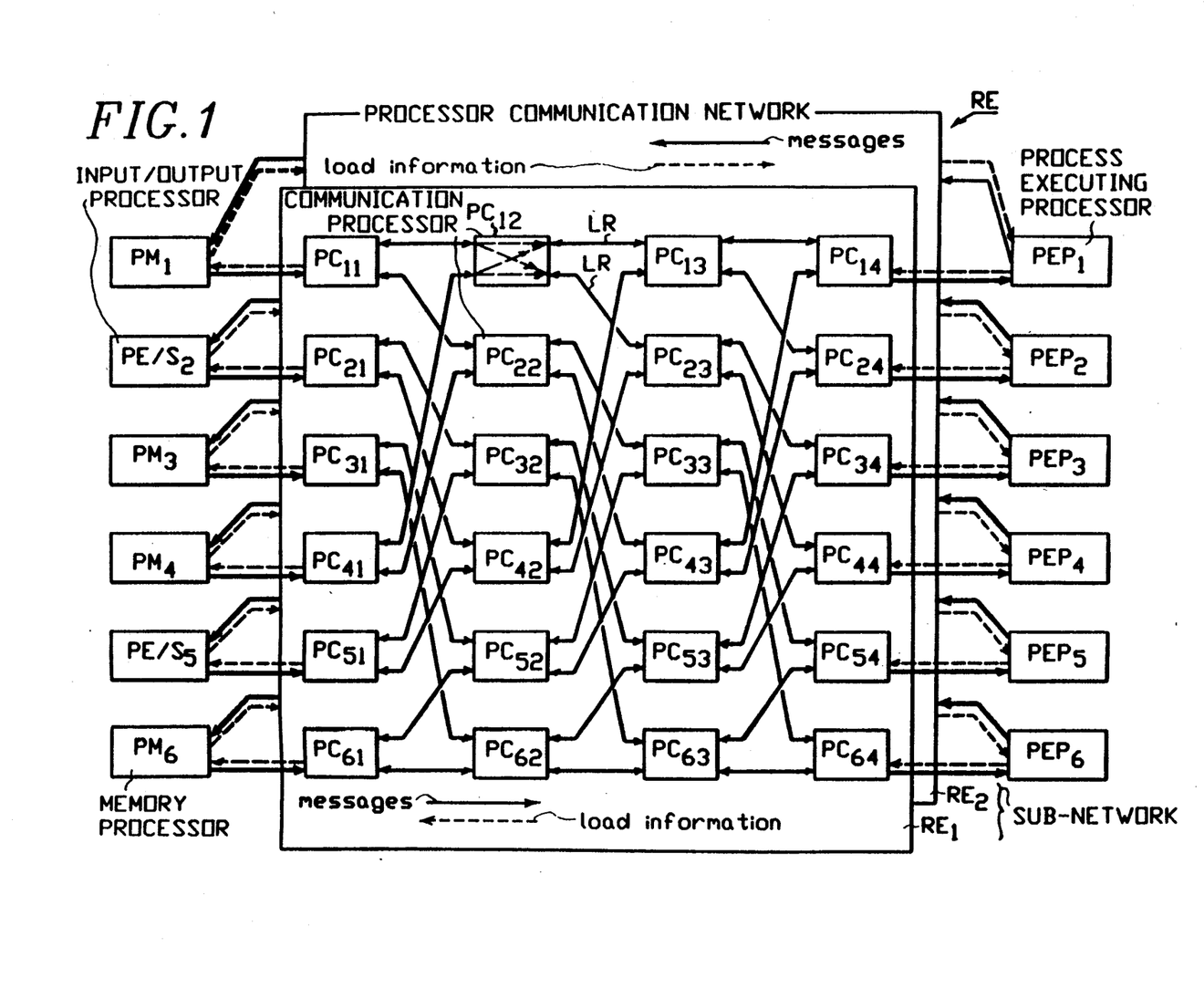
FIG. 1 shows schematically the overall architecture of a multiprocessor system which includes two communication networks embodying the invention.

In reference to FIG. 1, a multiprocessor data processing system is comprised of several types of processors specialized in different tasks. The system shown in FIG. 1 comprises four memory processor $PM_1$, $PM_3$, $PM_4$ and $PM_6$, two input/output processors $PE/S_2$ and $PE/S_5$, six process executing processors $PEP_1$ to $PEP_6$, and a processor communication network RE.

The purpose of the memory processors PM is to store programs being processed which represent e.g. symbol combinations in a formal application language such as LISP. When these programs are being carried out, the information circulates in the form of messages between the memory processors and the process executing processors PEP via the communication network RE.

The input/output processors PE/S are intended to connect the data processing system to means at the exterior of the system, e.g. to conversational terminals or to other data processing systems.

The process executing processors PEP carry out processing operations, e.g. symbolic reduction, on the messages received form the processors PM and PE/S. The messages processed by the process executing processors PEP are then possibly rerouted toward the memory processors PM via the network RE so as to be stored there or toward input/output processors PE/S.

The communication network RE is of the Omega type. The network RE is comprised of two sub-networks $RE_1$ and $RE_2$ respectively carrying messages in two transmission directions between the processors PM and PE/S and the processors PEP.

The sub-networks $RE_1$ and $RE_2$ each comprises twenty-four communication processors $PC_{11}$ to $PC_{64}$ specialized in message switching and transferring. The sub-network $RE_1$ carries messages including data to be processed in the transmission direction from the processors PM and PE/S toward the processors PEP. The sub-network $RE_2$ carries messages including data to be processed in the transmission direction from the processors PEP toward the processors PM and PE/S.

In the opposite direction to transmission direction of the messages, and on separate links, the sub-networks $RE_1$ and $RE_2$ transmit work load information pertaining to executing loads incumbent upon the processors PEP and memorization loads incumbent upon the processors PM. This load information enables the network RE to equitable divide out the work loads between the different memory processor PM and process executing processors PEP.

Each communication processor PC comprises first and second message input ports and first and second message output ports with which are respectively associated first and second load output ports and first and second load input ports. The communication processors are connected to one another by transmission links LR of the asynchronous type. The transfers of messages and load information via the links LR are carried out according to the well known asynchronous transmission process called "handshaking". As shown in FIG. 1 for the processor $PC_{12}$, a communication processor PC enables all connection possibilities between the two message input ports and the two message output ports. Two different messages may be transmitted simultaneously by the two message output ports.

Figure 2:
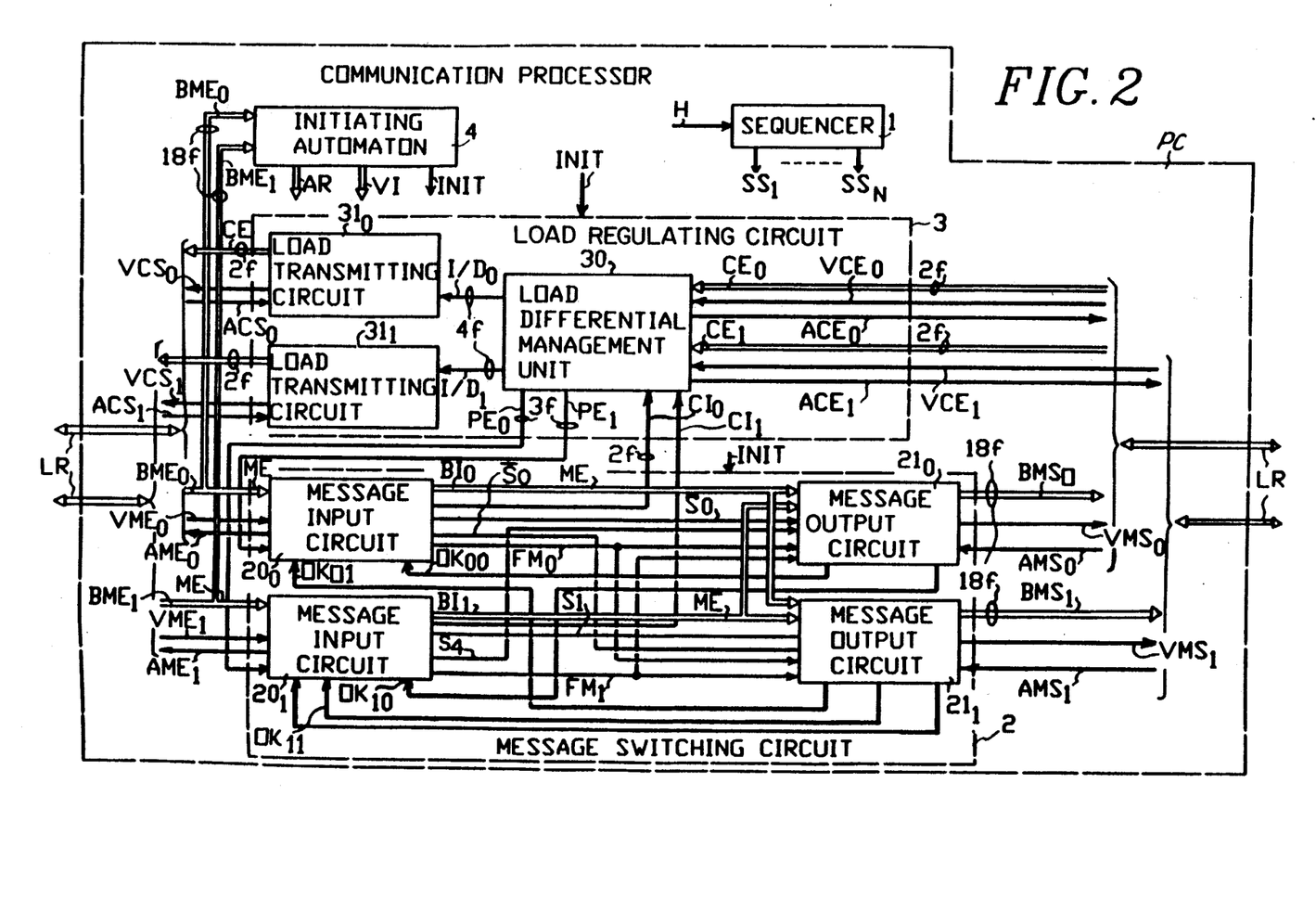
FIG. 2 is a schematical block diagram of a switching device embodying the invention, called as a communication processor.

In reference to FIG. 2, a communication processor PC comprises a sequencer 1, a message switching circuit 2, a load regulating circuit 3 and an initiating automaton 4.

Though the transmissions of messages and load information between processors occur according to an asynchronous mode, the internal operating of the processor PC is rigorously synchronous and is controlled by the sequencer 1.

The sequencer 1 receives a clock signal H produced by a local oscillator (not shown) and derives several sequencing signal $SS_1$ to $SS_i$ which are supplied to different circuits in the processor PC so as to control the operating of these circuits, switchings of different signals and transfers of data at precise predetermined moments in the operating cycle of the processor. The duration of the operating cycle of the processor PC is typically 120 ns.

The message switching circuit 2 comprises two analogous message input circuits $20_0$ and two analogous message output circuits $21_0$ and $21_1$.

The input circuits $20_0$ and $20_1$ are respectively connected to the first ad second message input ports of the processor PC et receive messages ME via incoming message buses $BME_1$ and $BME_1$ having typically 18 wires each. The transfers of messages comprised of words or elements, in the buses $BME_0$ and $BME_1$ are managed by means of conversational signals $VME_1$, $VME_1$ and $AME_0$, $AME_1$. In the logic state "1", the signals $VME_0$ and $VME_1$ respectively indicate to the input circuits $20_0$ and $20_1$ that the elements of the messages ME are valid on the buses $BME_0$ and $BME_1$. The signals $VME_0$ and $VME_1$ are supplied by processors in the network RE to which message input ports of the circuits $20_0$ and $20_1$ are connected. The signals $AME_0$ and $AME_1$ are respectively produced by the circuits $20_0$ and $20_1$ and each indicates in the state "1" that the respective input circuit has taken the message element into account correctly. The signals $AME_0$ and $AME_1$ are supplied to the processors of the network RE to which the message input ports of the circuits $20_0$ and $20_1$ are connected. The signals $VME_0$, $VME_1$ and $AME_0$, $AME_1$ respectively correspond to signals called "VALID" and "ACKNOWLEDGE" in the "handshaking" process. The circuits $20_0$ and $20_1$ also respectively receive 2-bit instruction words $PE_0$ and $PE_1$ supplied by the load regulating circuit 3. The words $PE_0$ and $PE_1$ indicate to the input circuits $20_0$ and $20_1$ the output circuits $21_0$ and $21_1$ toward which should be switched the incoming messages ME that do not have a specified destination in order to provide a proper divide of the work loads between the different processors. The words $PE_0$ and $PE_1$ are produced by the load regulating circuit 3 as a function of external load indicators $CE_0$ and $CE_1$ which are supplied to circuit 3 by the destination devices via the first and second load input ports, and as a function of internal load indicators $CI_0$ and $CI_1$ respectively provided by the input circuits $20_0$ and $20_1$.

The messages are transmitted form the input circuits $20_0$ and $20_1$ to first and second input ports of the output circuits $21_0$ and $21_1$ via internal buses $BI_0$ and $BI_1$ respectively.

The input circuits $20_0$ and $20_1$ apply selection signals $S_0$, $\overline{S_0}$, and $S_1$, $\overline{S_1}$ respectively to corresponding inputs of the output circuits $21_0$ and $21_1$. The selection signals $S_0$ and $\overline{S_0}$ and $S_1$ and $\overline{S_1}$ supplied form the input circuits $20_0$ and $20_1$ are complementary and select one of the output circuits $21_0$ and $21_1$ so as to inform it that a message intended for it is ready to be transmitted from the input circuit in the corresponding internal bus BI, after approval from the output circuit for transmission of the message.

The approval for transmission of a message is indicated by the output circuits $21_0$ and $21_1$ to the input circuits $20_0$ and $20_1$ by means of approval signals $OK_{00}$, $OK_{10}$, $OK_{01}$ and $OK_{11}$. The signals $OK_{00}$ and $OK_{10}$ are respectively supplied by the output circuit $21_0$ to the input circuits $20_0$ and $20_1$. The signals $OK_{01}$ and $OK_{11}$ are respectively supplied by the output circuit 21, to the input circuits $20_0$ and $20_1$. When e.g. the signal $OK_{00} = $ "1" is applied to the input circuit $20_0$ by the output circuit $21_0$, the output circuit $21_0$ thereby signals to the input circuit $20_0$ that it is ready for the message to be transferred. Beforehand, by putting the signal $S_0$ in the state "1", the input circuit had informed the output circuit $21_0$ that a message intended for it was awaiting to be transferred.

The input circuits $20_0$ and $20_1$ also respectively supply signals $FM_0$ and $FM_1$ to the two output circuits $21_0$ and $21_1$. The purpose of the signals $FM_0$ and $FM_1$ is to indicate the end of a message being transmitted, i.e., the last word transmitted in the message.

The output circuits $21_0$ and $21_1$ respectively issue the messages in outgoing message buses $BMS_0$ n and $BMS_1$ which are analogous to the incoming buses $BME_0$ and $BME_1$. Conversational signals $VMS_0$, $AMS_0$ and $VMS_1$, $AMS_1$ respectively control the asynchronous transmission of the messages in the buses $BMS_0$ and $BMS_1$.

The load regulating circuit 3 comprises a load differential management unit 30 and two load transmitting circuits $31_0$ and $31_1$.

The main purpose of the load regulating circuit 3 is to control the switching of the messages as a function of the network loads and to determine external load indicators CE to be transmitted toward the processors situated forward of the processor PC as regards the direction of message transmission. The load indicators CE are calculated in the circuit 3 from external load indicators $CE_0$ and $CE_1$ transmitted by the backward processors and internal load indicators $CI_0$ and $CI_1$ transmitted by the input circuits $20_0$ and $20_1$.

The load differential management unit 30 receives, on the input side, the load indicators $CE_0$ and $CE_1$ which are respectively transmitted via two 2-wire buses. Conversational signals $VCE_0$, $ACE_0$, $VCE_1$ and $ACE_1$ control the asynchronous transmission of the load indicators $CE_0$ and $CE_1$ in the buses. In addition to the instruction words $PE_0$ and $PE_1$, the circuit 30 issues two load count incrementation/decrementation order $I/D_0$ and $I/D_1$ respectively supplied to the load transmitting circuits $31_0$ and $31_1$ through two 4-bit buses. The orders $I/D_0$ and $I/D_1$ control in the load transmitting circuits $31_0$ and $31_1$ the incrementation ($+1$) and the decrementation ($-1$) of memory and execution load counts.

The load transmitting circuits $31_0$ and $31_1$ are analogous. The load indicators CE are transmitted by the circuits $31_0$ and $31_1$ in two 2-wire buses. Conversational signals $VCS_0$, $ACS_0$, $VCS_1$ and $ACS_1$ control the asynchronous transmission of the load indicators CE in the 15 buses.

The main purpose of the initiating automaton 4 is to adequately program the communication processor PC for the starting up of the data processing system in which the processor PC is included and during subsequent initiations. Automaton 4 is connected to the buses $BME_0$ and $BME_1$ to detect initiation messages carried by these buses. When an initiations message intended for its is detected by the automaton 4, the latter inhibits the operating of circuits 2 and 3 and activates an initiation process so as to program the processor PC while loading internal registers of circuits 2 and 3 with values contained in the detected initiation message. These values depend on the location of the processor PC within the communication network RE. When initiation is taking place, the automaton 4 successively provides, on the output side, several words VI and addresses AR transmitted to the internal registers to be initiated in circuits 2 and 3. The words VI have values equal to the values to be loaded in the internal registers. The addresses AR individually select the internal registers so as to load the words VI in them. The automaton 4 also provides, on the output side, an initiation signal INIT which is supplied to the circuits 2 and 3. The signal INIT is in the state "1" during initiation of the process PC and inhibits the operating of circuits 2 and 3. At the end of initiation, the signal INIT switches to the state "0" to authorize the operating of circuits 2 and 3.

Figure 3:
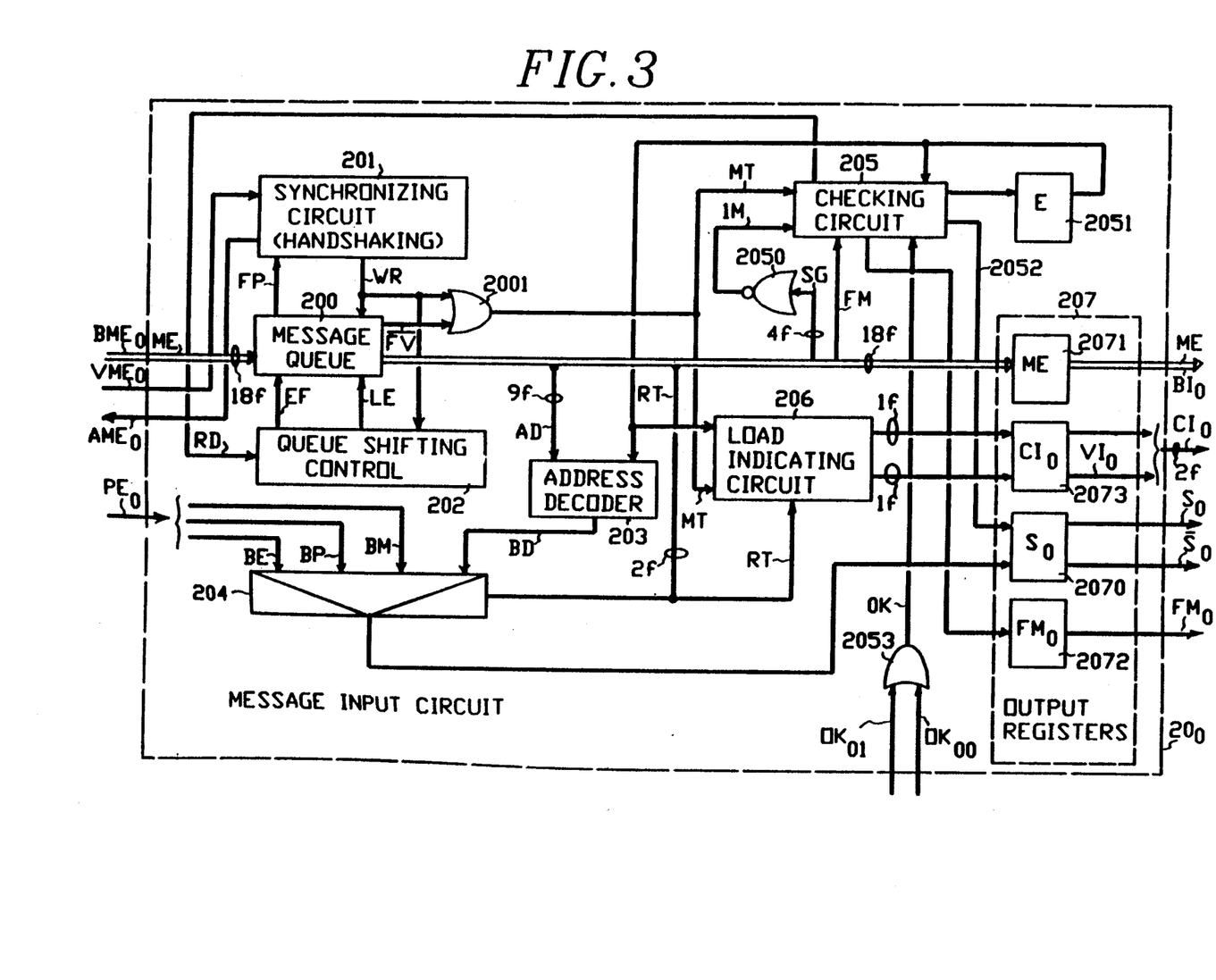
FIG. 3 is a block diagram of on of two message input circuits included in the switching device.

In reference to FIG. 3, the message input circuit $20_0$ comprises mainly a message queue 200, a synchronizing circuit 201, a queue shifting control circuit 202, an address decoder 203, a multiplexer 204, a checking circuit 205, a load indicting circuit 206, an a set of output registers 207.

The message queue 200 is a FIFO type queue. Queue 200 is comprised of 18-bit memory cells and receives word by word the messages ME to be temporarily stored. At input of the queue 200, the presence of a message to be loaded is detected by the synchronizing circuit 201.

The synchronizing circuit 201 manages the transmission of messages in the bus $BME_0$ according to the handshaking process by synchronizing the transmitter and the receiver at each element, or word, of the message. The circuit 201 receives the conversational signal $VME_0$ The queue 200 supplies the synchronizing circuit 201 with a signal FP which indicates in the state "1" that the queue 200 is full. The stats of the signals $VME_0$ and FP are periodically read at high frequency by the circuit 201. When the circuit 201 detects the state combination $(VME_0, FP)=(1, 0)$, a message element is waiting in the bus $BME_0$ and can be loaded into the queue 200. The circuit 201 then positions the signal $AME_0$ at state "1" to acknowledge the transfer of the message element. In parallel to this, the circuit 201 also positions a queue write control signal WR in the state "1". The signal WR is issued form the circuit 201 to a write control input of the queue 200 and authorizes writing of the message element in the queue 200. In order to avoid aberrant effects and behaviors caused e.g. by the appearance of a metastable state in the synchronizing circuit 201, the circuit 201 preferably comprises two flips-flops in cascade to sample and read the asynchronous conversational signal $VME_0$.

The signal WR is also applied to a first input of a two-input OR-gate 2001 and to an input of the queue shifting control circuit 202. A second input of the gate 2001 receives a signal $\overline{FV}$ issued by the message queue 200. The signal $\overline{FV}$ in the state "0" indicates that the queue 200 is empty and does not contain any messages.

The queue shifting control circuit 202 controls the pointer shifting operations in the queue 200 so as to enable the word by word writing and reading of words in the queue 200. The switching of the signal WR to the state "1" indicates to the circuit 202 that a message word is to be written in the queue 200. The circuit 202 controls the memorizing of the word ad the shifting of a write pointer EC.

A read control signal RD is supplied to the shifting checking circuit 202 by the checking circuit 205. The switching of the signal RD to the state "1" indicates to the circuit 202 that the reading of a message word in the queue 200 is requested by the checking circuit 205. The circuit 202 then controls the shifting of a read pointer LE to issue the following word on the output side.

Figure 4A:
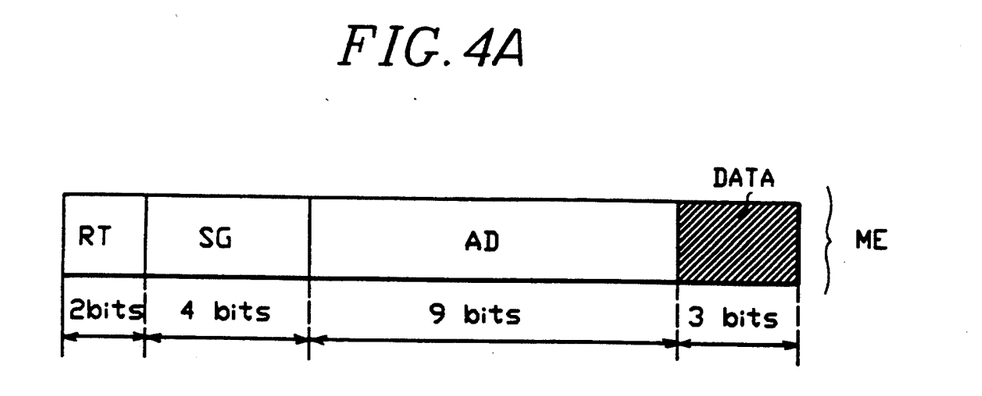
FIGS. 4A and 4B respectively show the structures of two different types of messages switchable by the switching device.
Figure 4B:
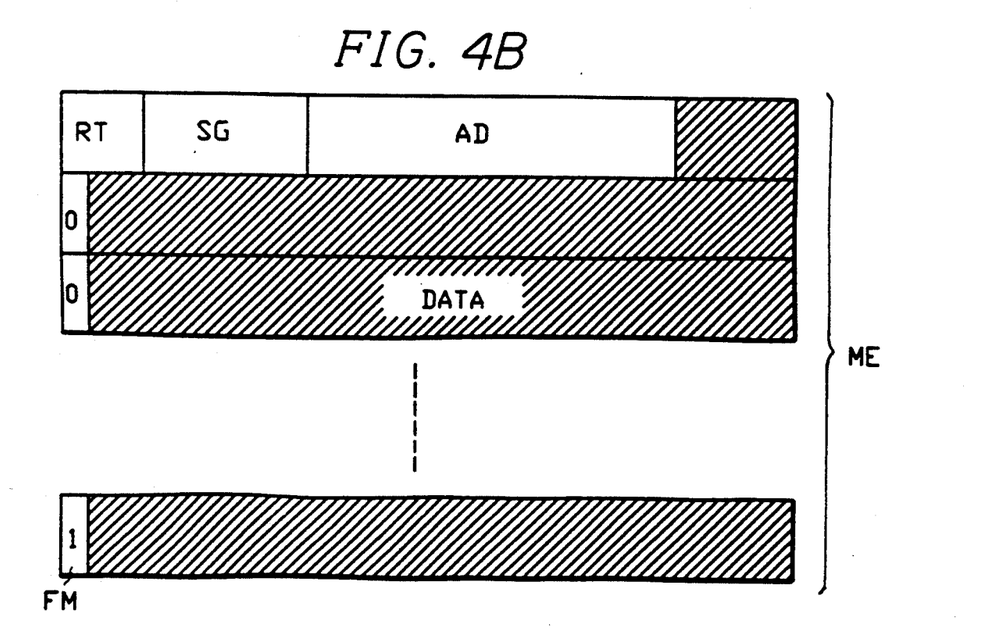

In reference to FIGS. 4A and 4B, a message ME of variable length is comprised of one or several 18-bit words. The first word of a message is subdivided into an address and signaling block and a data block. The address and signalling block is placed in the message header and comprises a routing code RT, a signalling code SG, and an address AD.

The routing code RT is comprised of two bits and indicates to the processor PC the routing processing to be applied to the message.

The signalling code SG comprised four bits and, in particular, signals to the processor PC whether the message is comprised of one or several words. When the message is comprised of just one word, the code SG has a value "0000". When the message is comprised of several words, the code SG has a value different form "0000".

The address AD is the address of a destination processor the message, and is comprised of 9 bits.

The routing code RT takes on different values "00", "01", "10" and "11". The code RT="00" indicates to the processor PC that the message is specifically intended for the processor indicated by the address AD and corresponds to a routing depending on address. The code RT="01" indicates to the processor PC that the message is to be processed as a function of the memory loads and is to be directed toward a memory processor PM. The code RT="10" indicates that the message is to be processed as a function of the execution loads and is to be directed toward a process executing processor PEP. The code RT="11" signals to the processor PC the need for exceptional routing in certain circumstances, e.g. in the event of failure of a communication processor PC of the network RE. For routings depending on memory load and execution load, and for an exceptional routing, the address AD is not significant and is not taken into account by the processor PC.

When the message ME is comprised of several words as shown in FIG. 4B, the most significant bit in the words following the first message word is a signalling word FM. In the state "0", the bit FM signals that the corresponding word is not the last word in the message, and in the state "1" that said word is the last word in the message.

In reference again to FIG. 3, the address decoder 203 receives the address AD contained in the first word of the message ME and provides a bit BD in the states "0" and "1" respectively when the message is to be switched toward the output circuits $21_0$ and $21_1$.

The address decoder 203 comprises decoding masks to isolate, in the address AD, bits concerning it as well as bits relating to a module number e.g. when the multiprocessor system is comprised of several interconnected modular communication networks. A pattern word and a routing bit are also memorized in other internal registers of the decoder 203 so as to respectively compare the corresponding address bits and a given pattern thereby establishing the output circuit toward which message is to be switched, and nevertheless specifying an output circuit in the event of divergence in the decoding.

The routing code RT is applied to control inputs of the multiplexer 204 and to input of the load indicating circuit 206.

The multiplexer 204 comprises four data inputs. A first input receives the bit BD provided form the address decoder 203. Second and third inputs respectively receive first BM and second BP bits of the instruction word $PE_0$ supplied by the load regulating circuit 3. The fourth input receives a bit BE which indicates that the backward processor is operating correctly and which is provided by the automaton 4. The bits BD, BM, BP and BE of the word $PE_0$ are respectively selected by the values "00", "01", "10" and "11" of the routing code RT. Like the bit BD, the bits BM, BP and BE respectively take on the state "0" and "1" when the message ME is to be switched toward the output circuits $21_0$ and $21_1$. the multiplexer 204 supplies an output circuit selection bit $S_0$ having the same logic state as the bit BD, BM or BE selected at input. A register 2070 of all the registers 207 receives the selection bit $S_0$ so as to memorize it. The register 2070 supplies, via complementary outputs, the selection signals $S_0$ and $\bar{S}_0$ respectively intended for the output circuits $21_0$ and $21_1$.

The purpose of the checking circuit 205 is to check the operating of the entire input circuit.

A signal $MT = \overline{FV} + WR$ produced by the OR-gate 2001 is supplied to the circuit 205 so as to inform it by means of a state "1" that one or more message elements are loaded in the queue 200 and are waiting to be processed.

The checking circuit 205 orders the reading of a message in the queue 200 by providing the signal RD = "1" to the queue shifting control circuit 202.

Each of the words of a message ME being read is temporarily stored in a buffer register 2071 in the output register set 207 prior to being transmitted in the bus $BI_0$. On reading of the first word of h message in the queue 200, the checking circuit 205 receives a signal 1M which provides it with information concerning the message length. The signal 1M is produced by a fourth-input NOR-gate 2050 receiving the signalling code SG included in the first word of the message. The signal 1M is respectively in the states "1" and "0" when the code SG has a value equal from "0000" and different to "0000". In the case of the signal 1M = "1", the checking circuit 205 is advised ha the message is comprised of just one word and it consecutively issues a message end bit $FM_0$ in the state "1". The bit $FM_0$ is loaded into a register 2072 of the output register set 207 so as to produce the message end signal $FM_0$ intended for the output circuits $21_0$ and $21_1$. In the case of the signal 1M = "0", the circuit 205 is informed that the message comprises several words. The circuit 205 comprises an input connected to an output of a data output port of the queue 200 to detect the bit FM included in the message words following the first word. When the bit FM = "1", indicating transmission of the last message word, indicates that transmission of the last word of the message has been read by the control circuit 205, the latter loads the message end bit $FM_0 = 1$ in the register 2072.

A state register 2051 is associated with the checking circuit 205 and memorizes a bit E indicating the operating state of the input circuit.

The checking circuit 205 writes the bit E in the state "0" when there are no messages being processed and during processing of a first message word.

The bit E written in the register 2051 is supplied by return to the control circuit 205, and is also applied at inputs of the address decoder 203 and of the load indicating circuit 206. When the bit E is in the state "0", it authorizes the operating of the address decoder 203 and of the load indicating circuit 206 during processing of the first word of the message, as well as the writing of the bit $s_0$ in the register 2070 and detection of the possible end of the message on the first word transmitted, 1M = "1". In order to control the writing of the bit $S_0$ in the register 2070, an output of circuit 205 is connected to a lading control input of the register 2070 by a link 2052.

The bit E is written in the state "1" by the checking circuit 205 as soon as the second word of the message is read. When the bit E is in the state "1", the operating of the address decoder 203 and the load indicating circuit 206 is inhibited and writing is on longer authorized in the register 2070. The bit E = "1" indicates that the words following the first word of a several-words message are being read. When the message end bit FM = "1" is detected by the circuit 205, the reading of the several-words message is finished. The circuit 205 issues the message end bit $fm_0$ and the bit E is written in the state "0".

After the first word in a message has been read in the queue 200 and temporarily stored in the buffer register 2071, the transfer of this first word into the bus $BI_0$ as well as the reading and transfer of the subsequent words in the message are only controlled by the circuit 205 after receipt of an approval signal $OK = OK_{00} + OK_{01} =$ "1" produced by the two-input OR-gate 2053 from the two approval signals $OK_{00}$ and $OK_{01}$ transmitted by the output circuit $21_0$ and $21_1$.

In addition to the routing code RT and the state bit E, the load indicating circuit 206 also receives at input the signal $MT = WR + \overline{FV}$ produced by the gate 2001. In terms of these different signals received at input, the circuit 206 produces the internal load indicator $CI_0$.

The load indicator $CI_0$ is a 2-bit word. The first bit $VI_0$ of the indicator validates in the state "1" the information carried by the second bit. The second bit of the indicator signals a message devoid of address, RT = "01" or RT = "10", switched toward a memory processor PM or a process executing processor PEP. When RT="01", the second bit is in the state "0"; when RT="10", the value of the second bit is "1". The indicator $CI_0$ is transmitted to the load regulating circuit 3 via a register 2073 of all the output registers 207.

The load indicators $CI_0$ and $CI_1$ enable the load regulating circuit 3 to anticipate the effect of the running of a message devoid of address on the dividing out of memory and execution loads between the processors. The anticipation mechanism on load calculation used by the load regulating circuit 3 is specified hereinafter. This mechanism enables errors concerning the estimation of the dividing out of loads between the processors to be minimalized, these errors being mainly caused by the propagation time of load information in the network RE.

Figure 5:
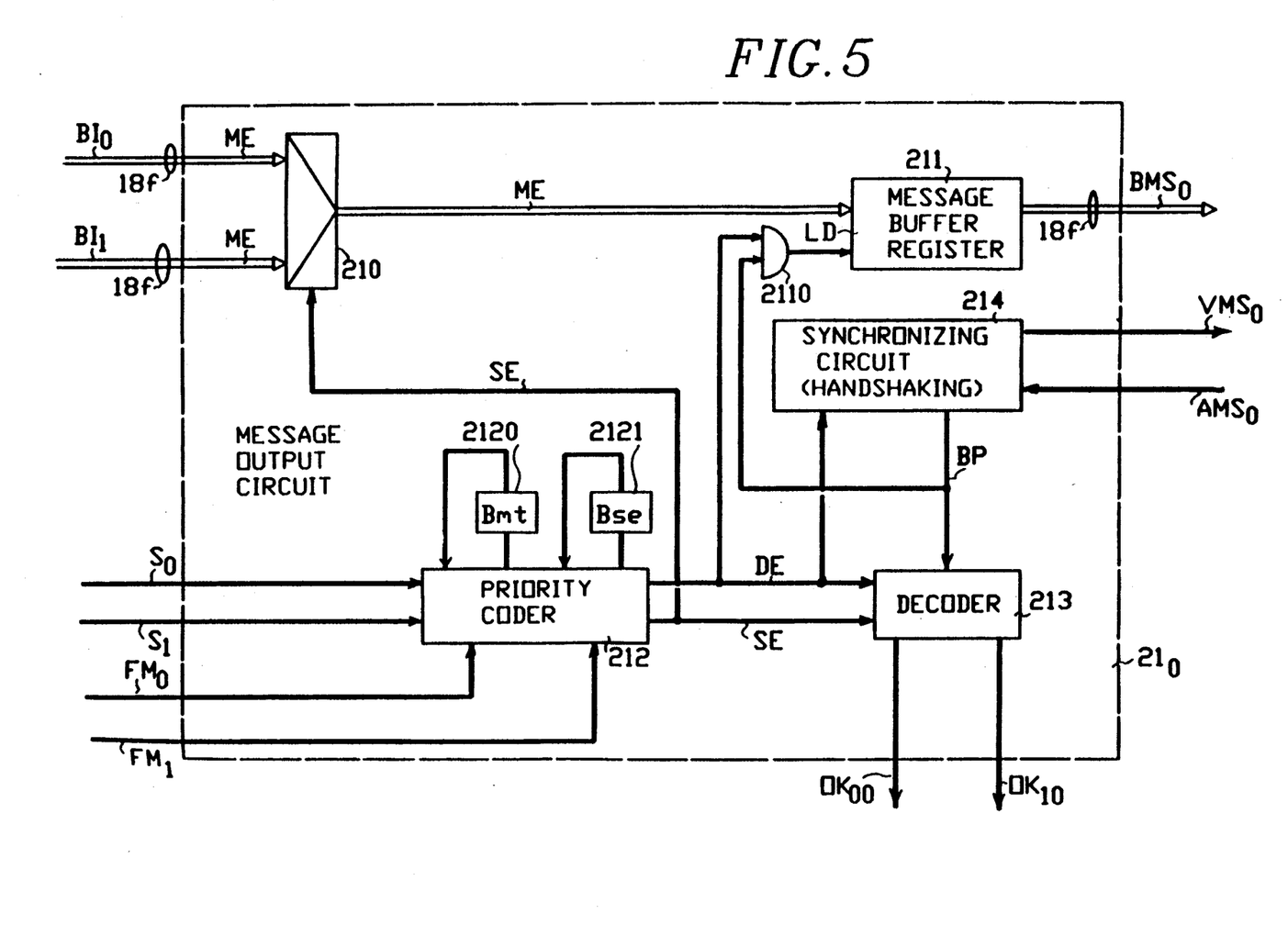
FIG. 5 is a block diagram of one of two message output circuits included in the switching device.

In reference to FIG. 5, the message output circuit $21_0$ is mainly comprised of a multiplexer 210, a message buffer register 211, a priority coder 212, a decoder 213, and a synchronizing circuit 214.

The multiplexer 210 comprises first and second input ports respectively connected to the buses $BI_0$ and $BI_1$ to receive the messages ME transmitted from the input circuits $20_0$ and $20_1$. A signal SE outgoing form the priority coder 212 is applied to a port selection input of the multiplexer 210.

The signal SE indicates which of input circuits $20_0$ or $20_1$ is authorized by the priority coder 212 to transmit a message. The states "0" and "1" of the signal SE respectively select the first and second input ports of the multiplexer 210. An output port of the multiplexer 210 is connected to the message output bus $BMS_0$ via a buffer register 211.

The main purpose of the priority coder is to arbitrate access conflicts between the input circuits $20_0$ and $20_1$ when these circuits simultaneously message transfer requests.

The priority coder 212 receives the signal $S_0$, $S_1$, $FM_0$ and $FM_1$ outgoing form the output circuits $21_0$ and $21_1$ and supplies the signal SE. In the state "1", signal DE indicates that at least one of the signals $S_0$ and $S_1$ is in the state "1" and that at least one message transmission request is consequently made by the input circuits $20_0$ and $20_1$.

Figure 6:
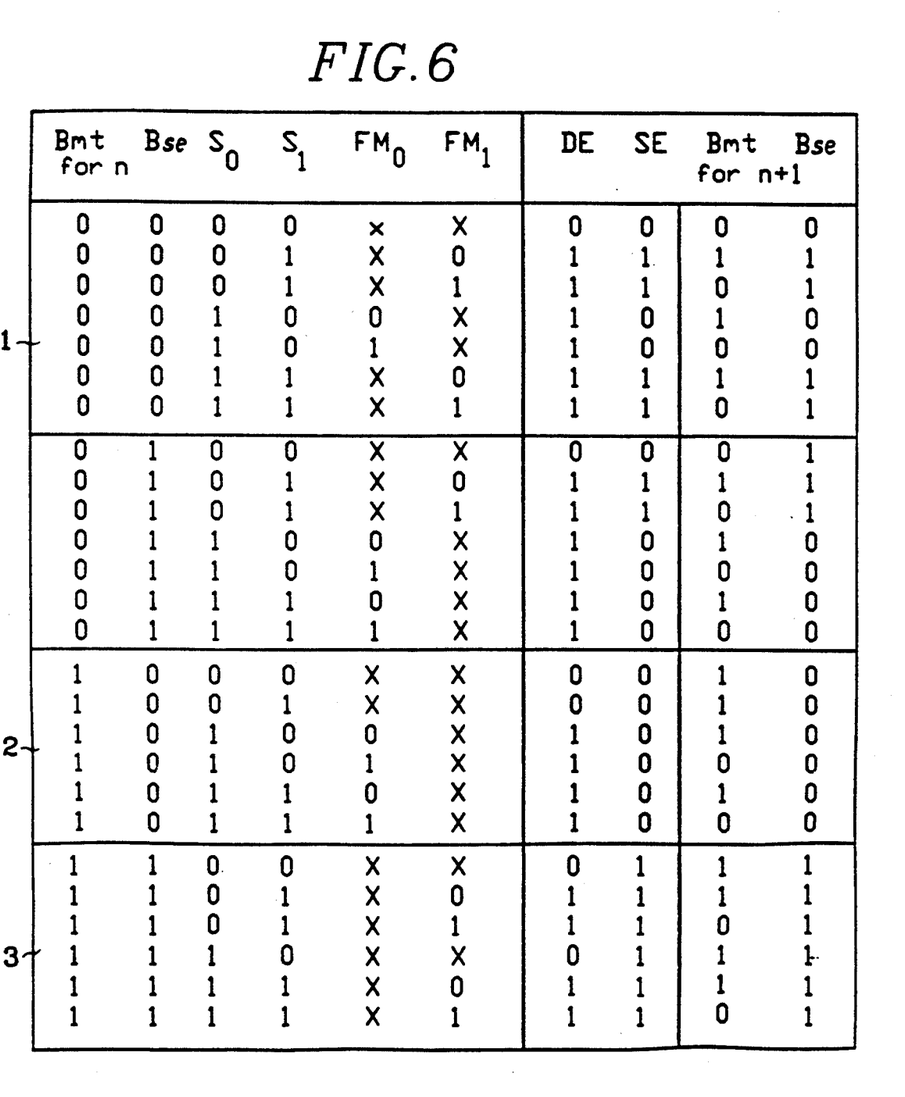
FIG. 6 is a truth table pertaining to the operating of a priority coder included in each of the two output circuits.

Two state registers 2120 and 211 are associated with the priority coder 212. The state registers 2120 and 2121 respectively memorize state bits Bmt and Bse that are written and read by the coder 212. In the state "1", the state bit Bmt indicates that a message is being processed, i.e. being transferred toward the bus $BMS_0$ via the output circuit $21_0$. The state "1" of the bit Bmt forbids any state changing of the priority coder 212 and of the signals SE and DE before a corresponding message nd signal $FM_0$ or $FM_1$ is detected. The bit Bse memorizes the origin of the message throughout the duration of the transfer. The states "0" and "1" of the bit Bse respectively signal messages coming form the input circuits $20_0$ and $20_1$.

for further information on the operating of the priority coder 212, the reader should refer to the truth table shown in FIG. 6. This table indicates the states of the output signals SE and DE as a function of the different possible states of the input signals $S_0$, $S_1$, $FM_0$ and $FM_1$, and the state bits Bmt and Bse. The input signals $S_1$, $S_1$, $FM_0$ and $FM_1$, and the state bits Bmt and Bse in an initial state n are shown on the left side of the truth table. The output signals DE and Se, and the bits Bmt and Bse after running to a subsequent state n+1 are shown on the right side of the truth table. Horizontally, the truth table is divided into three frames 1, 2 and 3. Frame 1 deals with the operation of the priority coder 212 when message transfer requests are made while no messages are being transferred. In the upper and lower parts of frame 1, the input circuit $20_0$ and $20_1$ are considered as having priority. Frames 2 and 3 of the truth table deal with the operation of the priority coder when the input circuits $20_0$ and $20_1$ are respectively in the course of transferring a message.

In further reference to FIG. 5, the decoder 213 is a logic circuit which produces the approval signals $OK_{00}$ and $OK_{10}$ from the signals SE and DE issued by the priority coder 212 and form a signal BP issued by the synchronizing circuit 214. The signal BP signals in the state "1" that the message output bus $BMS_0$ is available to transfer a message. The signals DE and BP in the state "1" authorize the activating of signals $OK_{00}$ and $OK_{10}$. The signal SE determines which of the signals $OK_{00}$ or $OK_{10}$ is to be activated.

The synchronizing circuit 214 is a complementary circuit to the synchronizing circuit 201 included in an input circuit and described in reference to FIG. 3. The signal DE is supplied to the circuit 214 to keep it informed of the message transfer requests coming from the input circuits. When the output bus $BMS_0$ is free, i.e., when the previous message element has been acknowledged, the synchronizing circuit 214 puts the element to be transmitted on the bus and activates the conversational signal $VMS_0$ in the state "1". In response, the backward processor positions the conversational signal $AMS_0$ in the state "1", thereby signalling that the message element has been acknowledged. Consecutively, the signal BF jumps to the state "1". The synchronizing circuit 214 then positions $VMS_0$ in the state "0" so as to signal that it has duly received the acknowledgement of receipt and, in response, the backward processor puts the signal $AMS_0$ in the state "0". The bus is then available again to ensure the transmission of another message element.

A two-input AND-gate 2110 is also provided in the output circuit $21_0$ so as to produce, form the signals SE and DE, a signal LD which is applied at a load control input of the buffer register 211. In the state "1", the signal LD authorizes the writing of message words in the buffer register 211, thereby enabling them to be progressively transferred in the bus $BMS_0$ as they are transmitted from the multiplexer 210.

Figure 7:
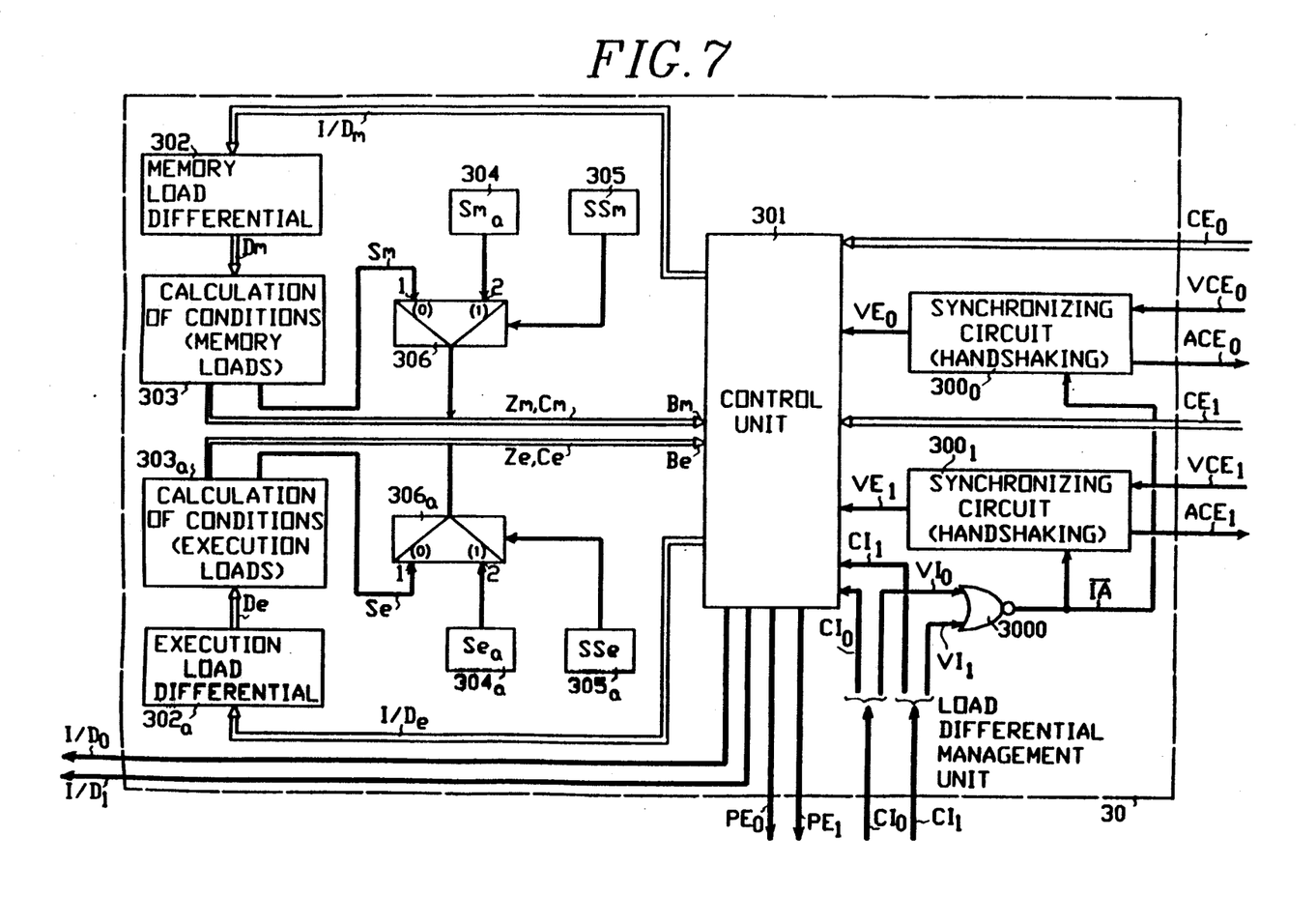
FIG. 7 is a block diagram of a load differential management unit included in a load regulating circuit of the switching device.

In reference to FIG. 7, the load differential management unit 30 is mainly comprised of two synchronizing circuits $300_0$ and $300_1$, a control unit 301, an up/down counter 302 and memory load differential conditions calculating circuit 302 and 303, and an up/down counter $302_a$ execution load differential conditions calculating circuit $303_a$.

The synchronizing circuit $300_0$ and $300_1$ are analogous to the synchronizing circuit 201 included in an input circuit and described in reference to FIG. 3. The synchronizing circuits $300_0$ and $300_1$ monitor the transmission of the external load indicators $CE_0$ and $CE_1$ via the first and second load input ports by means of the conversational signals $VCE_0$, $ACE_0$, and $VCE_1$, $ACE_1$ respectively. Validation signals $VE_0$ and $VE_1$ respectively for the load indicators $CE_0$ and $CE_1$ are issued to the control unit 301 by the synchronizing circuits $300_0$ and $300_1$.

Each of the external load indicators $CE_1$ and $CE_1$ is, e.g. comprised of two-bit signed words. A first bit of the indicator specifies its kind, i.e., memory load indicator or execution load indicator. The second bit is used to code and elementary load increment +1 or an elementary load decrement −1.

Schematically, the memory load of an output port corresponds to the rate of occupation of the memory seen by this port, the rate of occupation being defined as the quotient of the number of used memory cells by the total number of available cells.

More precisely, for the network commutation processors PC which see e.g., via the backward processors, several memory processors PM, the memory load corresponds to the minimum rate of occupation to the memory processors that are accessible via this port. Likewise, the execution load of an output port corresponds to the minimum rate of occupation of the execution processors accessible via this port.

The load differential value enables identification of the output port to be sued so as to be able to reach the unit with the least load at a given moment.

The messages leading to additional occupation of the memory processors (RT="01") or execution processors (RT="10") must be directed to the output with the least load. This implies that a load variation received by a commendation processor is only transmitted to the forward processors if this load variation has an effect on the output port with the least load.

The unit 301 processes first and foremost the external load indicators $CI_0$ and $CI_1$ also received at input. In this way, when at lest one of the validation signals $VI_0$ and $VI_1$ corresponding to the internal load indicators $CI_0$ and $CI_1$ is active, a two-input NOR-gate 3000 provides and inhibition signal $\overline{IA}$ in the state "0". The signal $\overline{IA}$ is applied to corresponding inputs of the circuits $300_0$ and $300_1$ and, in the state "0", forbids activation of the conversational signals $ACE_0$ and $ACE_1$ authorizing transmission of the external load indicators $CE_0$ and $CE_1$.

The values of the external load indicators $CE_0$ and $CE_1$ are conventionally marked $(+1)_m$, $(-1)_m$, $(+1)_e$ and $(-1)_e$. The increment $(+1)$ and the decrement $(-1)$ specify the values and signals of the load variations. The indexes m and e indicate that the variations that have been signalled respectively concern the memory load and the execution load.

From the load indicators $CE_0$, $CE_1$, $CI_0$ and $CI_1$, the control unit 301 determines incrementation/decrementation orders $I/D_m$ and $I/D_e$ to be applied respectively to the up/down counters 302 and 302a as well as the incrementation/decrementation orders $I/D_0$ and $I/D_1$ to be transmitted to the load transmitted circuits $31_0$ and $31_1$. In the event of external load variation, the orders $I/D_0$ and $I/D_1$ which are transmitted simultaneously to the circuits $31_0$ and $31_1$ are only produced if the detected load variation has an effect on the output port with the minimum load.

the up/down counters 302 and 302a respectively memorize the memory load differentials $Dm = CHm_0 - CHm_1$ and execution load differentials $DE = CHe_0 - CHe_1$, whereby $CHm_0$, $CHm_1$ and $CHe_0$, $CHe_1$ respectively representthe memory and execution loads corresponding to the first and second message output ports. The load differential Dm and De are respectively applied to input ports of the condition calculating circuits 303 and 303a. After an initiation of the processor PC by the initiating automaton 4, the load differentials Dm and De have initial values equal to zero, determined by the initiation message.

To the unit 301, the sign of a load differential indicates the message output port with the least load for the corresponding type of lad. A positive sign corresponding to a load differential indicates that he message output port with the least load is the second port. A negative sing corresponding to a load differential indicates that the message output port with the least load is the first port. More generally, a message is directed to the corresponding message output port with the least load. In this way, by directing e.g. a message intended for a memory processor PM toward the message output port assigned with the lowest memory load, there is a high probability that said message will reach one of the least loaded memory processors.

On receipt e.g. of the external load indicators $CE_0 = (+1)_m$ and $CE_0 = (-1)_m$, the unit 301 issues the orders $I/D_m$ respectively having values +1 and −1 thereby incrementing and decrementing the memory load differential Dm. On receipt of the load indicators $CE_1 = (+1)_m$ and $CE_1 = (-1)_m$, the unit 301 issues orders $I/D_m$ respectively with values +1 and −1 thereby decrementing and incrementing the differential Dm. The incrementation and decrementation of the execution loads De as a function of the load indicators $CE_0 = (+1)_e$, $CE_0 = (-1)_e$, $CE_1 = (+1)_e$ and $CE_1 = (-1)_e$ are carried out by the unit 301 by means of the corresponding order $I/D_e$ in an analogous manner to that described above for the memory load differential Dm, as a function of the corresponding external load indicators.

The control unit 31 uses the internal load indicators $CI_0$ and $CI_1$ to operate a mechanism for forecasting evolution of the load differential Dm and Ce. In fact, when e.g. a load indicator $CI_1 = (+1,0)_m$ is received by the unit 301 and signals a message routed on memory load ME received by the second input circuit $20_1$ and switched toward the first output circuit $21_0$, there is a strong probability that the running of this message ME through the first message output port will increase the memory load of the first message output port. The unit 301 then immediately orders a variation $I/D_m = +1$ of the corresponding load differential Dm. However, this load increase in the first output port must only be transmitted to the forward processors if this port remains at minimum load after the load increase. The load differential evolution forecast, or anticipation, has already been carried out by all the corresponding processors forward of the input circuit $21_0$ (in which the message has already been run). If the selected output circuit $21_0$ maintains its minimum load output status, the control unit 301 transmits the corresponding order $i/D_0 = (+1)_m$ toward the load transmitting circuit $31_0$ so that the latter signals the load increase to the forward processor connected to the first message input port and not having transmitted the message ME and in which the anticipation has therefore not been carried out.

If the selected output circuit $21_0$ does not maintaining a minimum load output status, i.e. if, in practice, the circuits $21_0$ and $21_1$ were to have the same load, the anticipation carried out by the communication processors forward of the input $20_1$ being incorrect, the unit 301 orders the circuit $31_1$ to transmit an order $I/D_1 = (-1)_m$ so as to cancel the effects of previous anticipations. As for the differential variation, it can be invalidated at a later stage by the backward communication processors.

the control unit 301 is capable of simultaneously processing two load indicators of the same kind, either $CE_0$ and $CE_1$ or $CI_0$ and $CI_1$, as a result of which the orders $I/D_m$ and $I/D_e$ can also take on the values $+2$ and $-2$.

According to a first embodiment, the conditions calculating circuits 303 and $303_a$ each simply comprise a sign detector and a zero detector. These circuits 303 and $303_a$ then provide sign bits Sm and Se and zero value signalling bits Zm and Ze respectively corresponding to the load differentials Dm and De. The sign bits Sm and Se are respectively transmitted to the control unit 301 through multiplexers 306 and 306a and buses Bm and Be. The operation of the multiplexers 306 and 306a will become clearer further on in the description. The bits Zm and Ze are supplied directly to the control unit 301 through the buses Bm and Be. In the state "0", the sign bits Sm and Se indicate to the control unit 301 that the corresponding differentials Dm and De have positive values. In the state "1", the sign bits Sm and Se indicate that the corresponding differentials Dm and De have negative values. In the state "1", the bits Zm and Ze indicate that the corresponding differentials Dm and De have zero values.

The control unit 301 determines from the bits Sm, Se, Zm and Ze the values to be attributed to the bits BM and BP of the instruction words $PE_0$ and $PE_1$ supplied to the input circuits $20_0$ and $20_1$, as well as to the incrementation/decrementation orders $I/D_0$ and $I/D_1$ supplied to the load transmitting circuits $31_0$ and $31_1$.

We will now consider, e.g. a memory load routing.

When the bit Zm is in the state "0", the unit 301 determines the message output port with a minimum load from the bit Sm. In the case of the bit Sm="0" indicating a positive differential Dm, the output port with the minimum load is the second port and the unit 301 then assigns to the bits BM of the words $PE_0$ and $PE_1$ a state "1" which indicates to the input circuits $20_0$ and $20_1$ that the incoming messages to be routed on memory load should be transmitted to the second output circuit $21_1$. In the opposite case where the bit Sm+"1" indicates a negative differential Dm, the message output port with the least load is the first port and the unit 301 then assigns to the bits BM of the words $PE_0$ and $PE_1$ a state "0" which indicates to the input circuits $20_0$ and $20_1$ that the messages should be transmitted to the first output circuit $21_0$.

When the bit Zm is in the state "1", the first and second message output ports have equivalent memory loads and the unit 301 assigns complementary states to the bits BM Of the words $PE_0$ and $PE_1$, e.g. a state "0" is assigned to the bit BM of the word $PE_0$ and a state "1" is assigned to the bit BM of the word $PE_1$.

In execution load routing, the unit 301 positions the bits BP of the words $PE_0$ and $PE_1$ as a function of the bits Ze and Se in a similar manner to that described above as regard the bits BM according to the bits ZM and Sm.

According to a second embodiment enabling accelerated processing of the loads, the conditions calculating circuits 303 and 303a respectively determine a plurality of memory load conditions Cm and execution load conditions Ce intended to be supplied to the control unit 301. Typically, the circuits 303 and 303a each calculate some twenty conditions relating to the corresponding load differentials Dm or De, notably e.g. conditions relating to the signals and passages at zero or other significant values ($+1$, $-1$) of the load differential and its derivatives. These types of conditions are conventional for optimum process control; they are well known to those skilled in the art and will therefore not be described in detail.

The conditions Cm and Ce enable the control unit 301 to anticipate the evolution of the switching instructions form the value of the load differential prior to their evolution, which requires a certain amount of time, and therefore to reduce the mechanism's reaction time compared to the basic mechanism described previously.

the load differential management unit 30 also comprises the multiplexer 306 and two registers 304 and 305 associated with the conditions calculating circuit 303, as well as the multiplexer $306_a$ and two other registers $304_a$ and $305_a$ associated with the conditions calculating circuit $303_a$.

The registers 304, $304_1$, 305 and $305_a$ are all one-bit registers. These registers are written in states determined "0" and "1" at the time of initiating the communication processor PC as a function of the location of the processor in the communication network RE. The registers 304 and $304_a$ respectively memorize sign bits $SM_a$ and $Se_a$, assigned to the memory load differentials Dm and execution load differentials De in the case where the processor Pc comprises at least one message output port ensuring the transfer of messages toward just one type of destination processor, memory processor PM or process executing processor PEP. The registers 305 and $305_a$ respectively memorize sign selection bits SSm and SSe corresponding to the load differentials Dm and De.

The purpose of the multiplexers 306 and $306_a$ is to select, among the sing bits SM, Se, $SM_a$ and $Se_a$, the two bits to be supplied to the unit 301, this selection depending on the states of the selection bits SSm and SSe. The sign bits Sm and Se are respectively applied at first data inputs 1 of multiplexers 306 and $306_a$. The sign bits $Sm_a$ and $Se_a$ are respectively applied to second data inputs 2 of multiplexers 306 and $306_a$. The bits SSm and SSe are respectively applied to selection input of multiplexers 306 and $306_a$.

When a message output port of the processor PC, e.g. the first port, is connected e.g. to a memory processor PM, the first message output port of the processor PC must not in any case be selected to transmit a message devoid of address to a process executing processor PEP. The solution used to avoid such a selection is to assign to the corresponding differential, Dm in this example, a positive or negative sign such that said first message output port appears in all cases to the unit 301 as having an execution load greater than the execution load of the second message output port.

In the state "1", the selection bits SSm and SSe respectively indicate that the first and second message output ports from the processor PC are connected to processors PM and PEP and respectively control the selection of the sign bits $Sm_a$ and $Sm_e$. The bits $Sm_a$ and $Sm_e$ indicate to the unit 301 the signs assigned to the differentials Dm and De whereby the unit selects the message output ports in an adequate manner.

Figure 8:
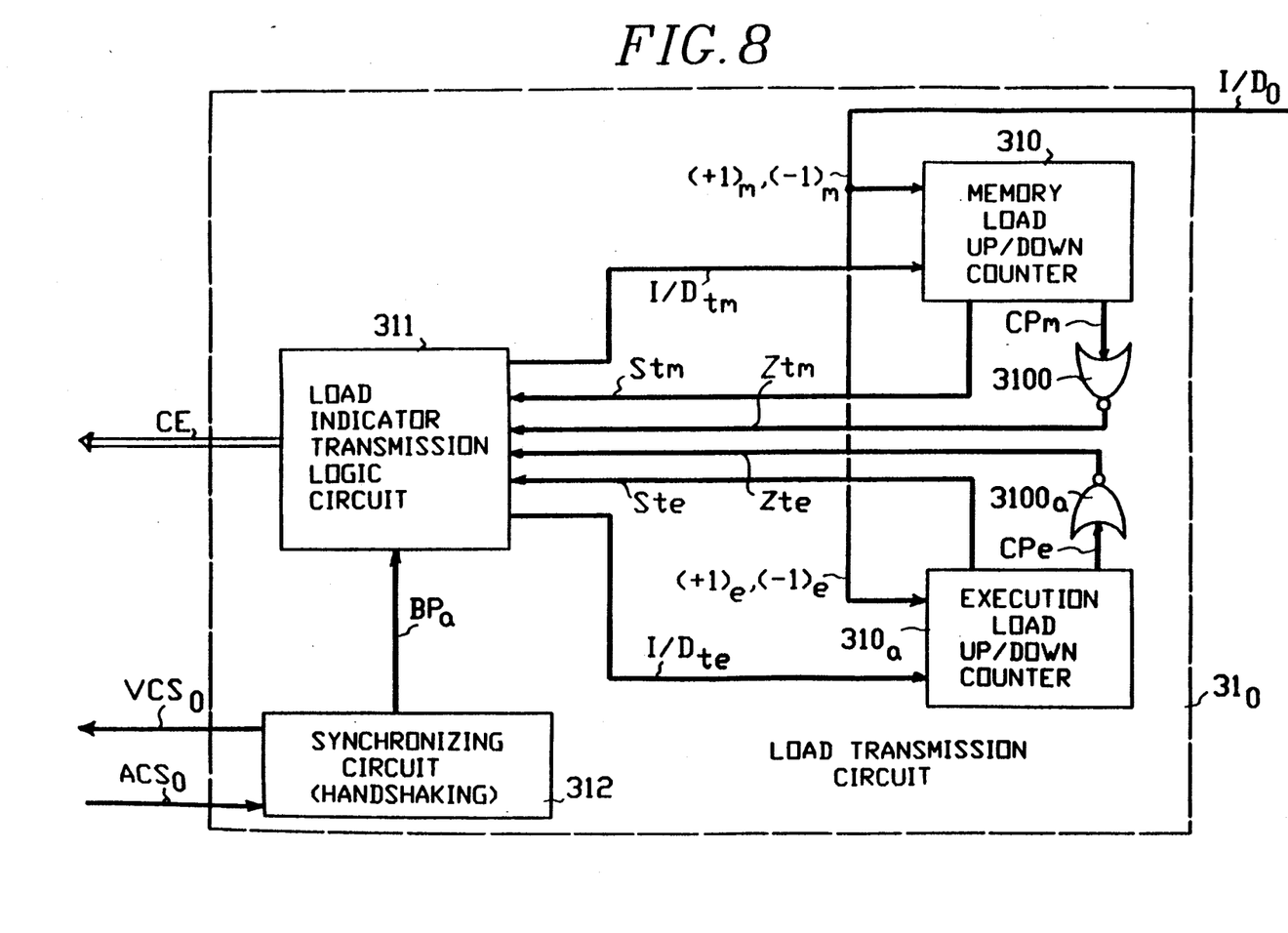
FIG. 8 is a block diagram of one of two load transmitting circuits also included in the load regulating circuit.

In reference to FIG. 8, the load transmitting circuit $31_0$ mainly comprises a memory load up/down counter 310, an execution load up/down counter $310_a$, a load indicator transmission logic circuit 311, and a synchronizing circuit 312.

The purpose of the load transmitting circuit $31_0$ is to autonomously manage the transmission of the external load indicator DE in the terms of the load counts. The circuit $31_0$ plays the role of "buffer" circuit and frees the management unit 30 of temporal constants related to the transmission of indicators.

The up/down counters 310 and 310$_a$ are analogous and respectively memorize a signed count of memory loads CPm and a singed count of execution loads CPe. The counts CPma nd CPe are reset at zero when the data processing system is started up or after a further initiating operation, and are incremented and decremented as a function of the values successively taken on by the order I/D$_0$ supplied by the load differential management unit 30 and to the external load indicator values CE successively transmitted by the transmission logic circuit 311.

The incrementation/decrementation order I/D$_0$ is applied to first control inputs of up/down counters 310 and 310$_a$. Second control inputs of the up/down counters 310 and 310$_a$ respectively receive incrementation/-decrementation order I/D$_{tm}$ and I/D$_{te}$ supplied by the transmission logic circuit 311 during the transmission of load indicators CE.

The order I/D$_0$=(+1)$_e$ and I/D$_0$=(−1)$_m$ respectively increment and decrement the load count CPe contained in the reversible counter 310$_a$.

The load indicator transmission logic circuit 311 transmits load indicators CE=(+1)m, CE=(−1)m, CE=(+1)e, and CE=(−1)e in such a way as to reset the load counters CPm and CPe at zero. To the transmission of the load indicators CE=(+1)m and CE=(−1)m, respectively CE=(+1)e and CE=(−1)e, respectively corresponding orders I/D$_{tm}$=−1 and I/D$_{tm}$=+1, respectively I/D$_{te}$=−1 and I/D$_{te}$=+1.

To enable the transmission logic circuit 311 to determine the load indicator values to be transmitted, bits Stm, Ztm, Ste and Zte are supplied to corresponding inputs.

The bits Stm and Ztm relate to the load count CPm and respectively indicate the sign and a zero value of the count CPm. The bits Ste and Zte relate to the load count CPe and respectively indicate the sign and a zero value of the count CPe. The sign bits Stm and Ste are respectively read in the up/down counters 310 and 310$_a$. The bits Ztm and Zte are respectively produced by the NOR-gates 3100 and 3100$_a$. Inputs of gates 3100 and 3100$_a$ receive the different bits, other than the sign bits, of the counts CPm and CPe and respectively derives the bits Ztm and Zte, receptively.

The synchronizing circuit 312 manages the conversational signals VCS$_0$ and ACS$_0$ for the asynchronous transmission of the load indicators CE according to the handshaking process. A signal BPa supplied by the synchronizing circuit 312 indicates to the transmission logic circuit 311 whether or not the load output bus is available.

What we claim is:

1. A data message communication network for a multiprocessor system, the network comprising:
   a plurality of data message switching devices interconnected with each other to form a predetermined network architecture,
   each of said data message switching devices comprising, for one of two opposite message transmission directions:
   first and second input means respectively connected to respective output means in two of said message switching devices located upstream of each of said switching devices with respect to said one transmission direction,
   first and second output means respectively connected to respective input means in two of said data message switching devices located downstream of each of said switching devices with respect to said one transmission direction,
   load regulating means connected to (a) said first and second input means, (b) said output means of said two upstream-located data message switching devices, and (c) said input means of said two downstream-located data message switching devices for deriving switching instructions and internal load information, said switching instructions selectively controlling switching of data messages received by said first and second input means from said output means of said two upstream located data message switching devices and being derived as a function of information for first and second external loads, the information for the first and second external loads being respectively received form load regulating means of said two downstream-located data message switching devices and as a function of internal load information derived by said input means in said two downstream-located data message switching devices as soon as a data message is received and before said data message is switched as a function of message switchings carried out in said input means of said two downstream-located data message switching devices, said load regulating means further deriving other information for the first and second external loads, the other information for the first and second external loads being respectively coupled to said output means of said two upstream-located data message switching devices and being calculated in terms of said information for the first and second external loads and the internal load, and
   control means distributed in said first and second input and output means for controlling switching of the data messages as a function of (a) routing information included in the messages, (b) said switching instructions derived by said load regulating means, and (c) priority instructions respectively assigned to said output means of said upstream-located data message switching devices; said control means in said first and second input means producing said information for the internal load.

2. The network as claimed in claim 1, wherein each of said message switching devices processes and derives different types of load information that respectively correspond to different types of loads respectively associated with different types of processing to which the messages are submitted in said input means in said two downstream-located data message switching devices, and with different types of destination mans.

3. The network as claimed in claim 1, wherein said messages and said information for the loads are transferred between of each said data message switching device and said downstream-located and upstream-located data message switching devices according to an asynchronous transmission process.

4. A network as claimed in claim 1, wherein each of the first and second input means of each of said data message switching devices comprises:
   a buffer queue for temporarily stocking said messages transmitted by said output means of said two upstream-located data message switching devices,
   means for word by word controlling the message writing and reading in said buffer queue,
   means for selecting one of said first and second output means toward which a message read in said buffer queue is to be switched, said output means being selected by decoding said routing information included in the message and as a function of said switching instructions derived by said load regulating means, mean for producing said internal load information as a function of the routing information included in said read message, and means for controlling reading of said message in said buffer queue, transferring of the read message and the internal load information respectively to said selected output means and said load regulating means, said controlling means also checking operations of said selecting 5. A network as claimed in claim 1, wherein each of the first and second output means of said each data message switching device comprises:

means for coupling one of said first and second input means into a selected input means as a function of predetermined priority instructions assigned to said said first and second input means when said first and second input means simultaneously request a message transmission authorization form each of said output means, means for informing said selected input means that said authorizing output means authorizes said message transmission, and means having first and second inputs respectively connected to the first and second input means and an output connected to the destination means corresponding to said output means for switching over said message having authorized transmission from the selected input means to said destination means.

6. A network as claimed in claim 1, wherein said load regulating mean in said each data message switching device comprises:

means for memorizing different load count differentials corresponding to different types of loads, each of said differentials having a value representative of the difference between a number corresponding to information for the first load, said first and second load information being transmitted by said input means of said two downstream-located data message switching devices, means of incrementing and decrementing said load count differentials as a function of the information of the first and second loads transmitted by said said input means of said two downstream-located data message switching devices and said internal load information produced by said input means in said two downstream-located data message switching devices, means for determining said switching instructions to be supplied to said first and second input means, and means for deriving the information of the first and second loads as a function of values and variations of said load count differentials, thereby transmitting said first and second load information to said output means of said two upstream-located data message switching devices.

7. A network as claimed in claim 1, wherein said load regulating means further comprises:

means for forecasting the evolution of values and variations of said load count differentials, means for determining said switching instructions to be supplied to said first and second input means and means for deriving the information of the first and second loads as a function of said forecast evolution of values and variations of said load count differentials, thereby transmitting the information of the first and second loads to said output means of said two upstream-located data message switching devices.

* * * * *